United States Patent [19]

Shinozaki et al.

[11] Patent Number: 4,708,811
[45] Date of Patent: Nov. 24, 1987

[54] ELECTROLYTE FOR ELECTROLYTIC CAPACITOR

[75] Inventors: Fumihiko Shinozaki; Yutaka Yokoyama, both of Ome, Japan

[73] Assignee: Nippon Chemi-Con Corporation, Tokyo, Japan

[21] Appl. No.: 19,867

[22] Filed: Feb. 27, 1987

[30] Foreign Application Priority Data

Feb. 28, 1986 [JP] Japan ................................ 61-41739

[51] Int. Cl.$^4$ ............................................. H01G 9/00
[52] U.S. Cl. ...................................... 252/62.2; 549/4; 549/213
[58] Field of Search ..................... 549/4, 213; 252/62.2

[56] References Cited

U.S. PATENT DOCUMENTS

| | | | |
|---|---|---|---|
| 3,014,952 | 12/1961 | Birum et al. | 549/4 |
| 3,118,939 | 1/1964 | Finkelstein | 252/62.2 |
| 4,451,659 | 5/1984 | Potts | 549/4 |

Primary Examiner—Arthur P. Demers

[57] ABSTRACT

An electrolyte for electrolytic capacitor containing within an aprotic solvent a tetrafluoroboric acid salt of a pyrylium or thiopyrylium compound as solute.

An electrolyte for electrolytic capacitor according to the invention may conveniently be prepared by dissolving a tetrafluoroboric acid salt of a pyrylium or thiopyrylium compound to an aprotic solvent until a desired conductivity is obtained, for example, as an approximately 10% by weight solution.

2 Claims, No Drawings

ELECTROLYTE FOR ELECTROLYTIC CAPACITOR

FIELD OF THE INVENTION

This invention relates to an electrolyte for electrolytic capacitor containing within an aprotic solvent a tetrafluoroboric acid salt of a pyrylium or thiopyrylium compound as solute.

BACKGROUND OF THE INVENTION

Hitherto, organic acids or its salts and glycol series pastes have been principally used as an electrolyte for electrolytic capacitor in the general purposes. The latest expansion of utilization for the electronic instruments requires more improvement and advancement in the reliability and performance of the capacitor entailing undesired problem of the presence of water in the paste and as a result an electrolyte using an aprotic solvent in place of organic acid and its salt and glycol paste has become to receive an attraction.

The greatest subject of employment of the aprotic solvent system electrolyte is how to obtain an electrolyte of high conductivity and to achieve this an organic carboxylic acid or its salt which is well soluble in the aprotic solvent and has a high degree of dissociation has been researched as a main work but not yet succeeded. To solve the matter and obtain a high conductivity a solvent which produces water resulted by the reaction between acids and alcohols or glycols and even water is incorporated into the aprotic solvent with still insufficient conductivity, increments of water and solute contents with poor reliability at the elevated temperature as disclosed in the Japanese patent publications Nos. 55-3989, 57-56763, 58-32769 and the U.S. Pat. No. 4,117,531.

After extensive researches and studies to obtain an electrolyte which is substantially nonaqueous system electrolyte and has a high conductivity with use of an aprotic solvent but without using any solvent which forms water in reaction between acids and alcohols with glycols, it has been discovered that a tetrafluoroboric acid salt of a pyrylium or thiopyrylium compound has a high solubility in the aprotic solvent with an enhanced releasability and provide a high conductivity.

SUMMARY OF THE INVENTION

Thus, a principal object of the invention is to provide an electrolyte of substantially non water series high conductivity with use of the aprotic solvent.

An electrolyte for electrolytic capacitor according to the invention is characterized by containing a tetrafluoroboric acid salt of a pyrylium or thiopyrylium compound in the aprotic solvent as solute.

PREFERRED EMBODIMENTS OF THE INVENTION

The tetrafluoroboric acid salt of a pyrylium or thiopyrylium compounds according to the invention is preferably selected from the compounds of general formula,

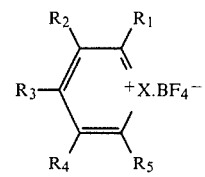

in which $R_1$, $R_2$, $R_3$, $R_4$ and $R_5$ represent hydrogen atom, phenyl group or alkyl group having 1 to 15 carbon atoms and X represents oxygen or sulfur atom.

The pyrylium or thiopyrylium compound to be preferably used in the invention may be synthesized by the method described in "New Experimental Chemical Course, [Synthesis and Reaction of Organic Compound (IV)]", edited by the Japanese Chemical Society, pages 2015 to 2019 and 2056, for example, benzylidene acetophenone undergoes an aldol condensation cyclization reaction with acetophenone in 1,2-dichloroethane by tetrafluoroboric acid to obtain 2,4,6-triphenyl pyrylium tetrafluoroborate, and a thiopyrylium compound is obtained by reacting the corresponding pyrylium ion with sulfid ion.

The aprotic solvent to be used in the invention may be selected from the following but not limited thereto:

(1) Amide system solvent:
N-methylformamide, N,N-dimethylformamide, N-ethylformamide, N,N-diethylformamide, N-methylacetoamide, N,N-dimethylacetoamide, N-ethylacetoamide, N,N-diethylacetoamide, hexamethylphosphorinamide (2) Oxide compounds:
dimethylsulfoxide (3) Nitrile compounds:
acetonitrile (4) Cyclic esters, cyclic amides:
γ-butyrolactone, N-methyl-2-pyrrolidone, ethylene carbonate, propylene carbonate.

An electrolyte for electrolytic capacitor according to the invention may conveniently be prepared by dissolving a tetrafluoroboric acid salt of a pyrylium or thiopyrylium compound to an aprotic solvent until a desired conductivity is obtained, for example, as an approximately 10% by weight solution.

EXAMPLES 1 to 12

An electrolyte for electrolytic capacitor according to the invention will be exemplified in the following with 10% by weight solution for tetrafluoroboric acid salt of various pyrylium and thiopyrylium compounds with respect to the conductivity as shown in Table 1.

Further, as comparative example the conventional standard electrolytes composed of 78% by weight of ethylene glycol, 12% by weight of water and 10% by weight of ammonium adipate are shown also in Table 1.

TABLE 1

| Example | Pyrylium or Thiopyrylium Tetrafluoroborate Compound | Aprotic Solvent | Conductivity (ms/cm) |
|---|---|---|---|
| 1 | 2,4,6-trimethylpyrylium tetrafluoroborate | γ-butyrolactone | 13.3 |
| 2 | 2,4,6-triphenylpyrylium tetrafluoroborate | γ-butyrolactone | 7.14 |
| 3 | 2,4,6-trimethylthiopyrylium tetrafluoroborate | γ-butyrolactone | 11.5 |
| 4 | 2,4,6-triphenylthiopyrylium tetrafluoroborate | acetonitrile | 15.4 |

TABLE 1-continued

| Example | Pyrylium or Thiopyrylium Tetrafluoroborate Compound | Aprotic Solvent | Conductivity (ms/cm) |
|---|---|---|---|
| 5 | 2,4,6-triphenylpyrylium tetrafluoroborate | acetonitrile | 17.5 |
| 6 | 2,4,6-trimethylpyrylium tetrafluoroborate | acetonitrile | 33.3 |
| 7 | 2,4,6-trimethylpyrylium tetrafluoroborate | N—methylformamide | 13.9 |
| 8 | 2,4,6-trimethylpyrylium tetrafluoroborate | N,N—dimethyl formamide | 16.4 |
| 9 | 2,4,6-triphenylpyrylium tetrafluoroborate | N—methylformamide | 15.9 |
| 10 | 2,4,6-trimethylpyrylium tetrafluoroborate | N,N—dimethyl formamide | 20.0 |
| 11 | 2,4,6-triphenylpyrylium tetrafluoroborate | N,N—dimethyl formamide | 14.5 |
| 12 | 2,4,6-trimethylpyrylium tetrafluoroborate | dimethyl sulfoxide | 12.2 |
| Ref. | ethylene glycol water ammonium adipate | 78% by weight 12% by weight 10% by weight | 6.7 |

The high-temperature load test obtained at 10 V 47 micro F for electrolytes exemplified in examples 1 to 12 and comparative example are shown in Table 2.

TABLE 2

| | Initial Value | | | 110 deg. C. 1000 hours | | |
|---|---|---|---|---|---|---|
| Example | Capacity $\mu F$ | tan $\delta$ | Leakage Current $\mu A$ | Capacity $\mu F$ | tan $\delta$ | Leakage Current $\mu A$ |
| 1 | 55.2 | 0.034 | 0.18 | 52.7 | 0.034 | 0.07 |
| 2 | 54.0 | 0.057 | 0.17 | 53.6 | 0.058 | 0.06 |
| 3 | 54.9 | 0.036 | 0.19 | 54.6 | 0.038 | 0.07 |
| 4 | 55.3 | 0.032 | 0.19 | 53.0 | 0.035 | 0.08 |
| 5 | 55.3 | 0.031 | 0.20 | 53.6 | 0.036 | 0.08 |
| 6 | 55.8 | 0.028 | 0.21 | 54.5 | 0.037 | 0.08 |
| 7 | 55.1 | 0.032 | 0.18 | 54.9 | 0.033 | 0.09 |
| 8 | 55.3 | 0.031 | 0.20 | 54.6 | 0.035 | 0.09 |
| 9 | 55.2 | 0.032 | 0.19 | 54.8 | 0.033 | 0.08 |
| 10 | 55.4 | 0.030 | 0.20 | 54.2 | 0.035 | 0.08 |
| 11 | 55.3 | 0.033 | 0.19 | 54.7 | 0.037 | 0.09 |
| 12 | 55.2 | 0.035 | 0.19 | 54.5 | 0.039 | 0.08 |
| Ref. | 53.7 | 0.065 | 0.17 | 48.0 | 0.098 | 0.11 |

The electrolyte according to the invention may provide a non water series electrolyte having a high conductivity equivalent to or more than the conductivity of the conventional electrolyte composed of glycols, water and organic acid salt with improved and wide applicability in design of electrolytic capacitor.

What is claimed is:

1. An electrolyte for electrolytic capacitor containing within an aprotic solvent a tetrafluoroboric acid salt of a pyrylium or thiopyrylium compound of general formula,

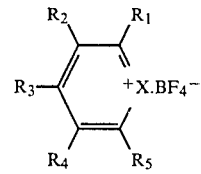

in which $R_1$, $R_2$, $R_3$, $R_4$ and $R_5$ represent hydrogen atom, phenyl group or alkyl group having 1 to 15 carbon atoms and x represents oxygen or sulfur atom.

2. An electrolyte for electrolytic capacitor according to claim 1, wherein aprotic solvent is selected from the group of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile or the mixture thereof.

* * * * *